Figure 3:
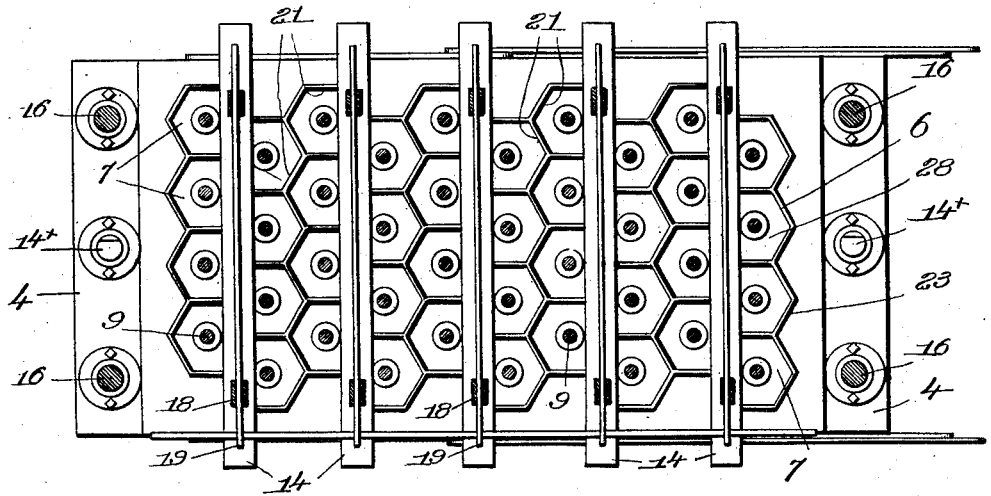

No. 737,620. PATENTED SEPT. 1, 1903.
A. T. HASKELL.
MACHINE FOR MOLDING AND PRESSING INTO SHAPE
MOLDABLE MATERIAL.
APPLICATION FILED JAN. 14, 1903.
NO MODEL. 2 SHEETS—SHEET 1.
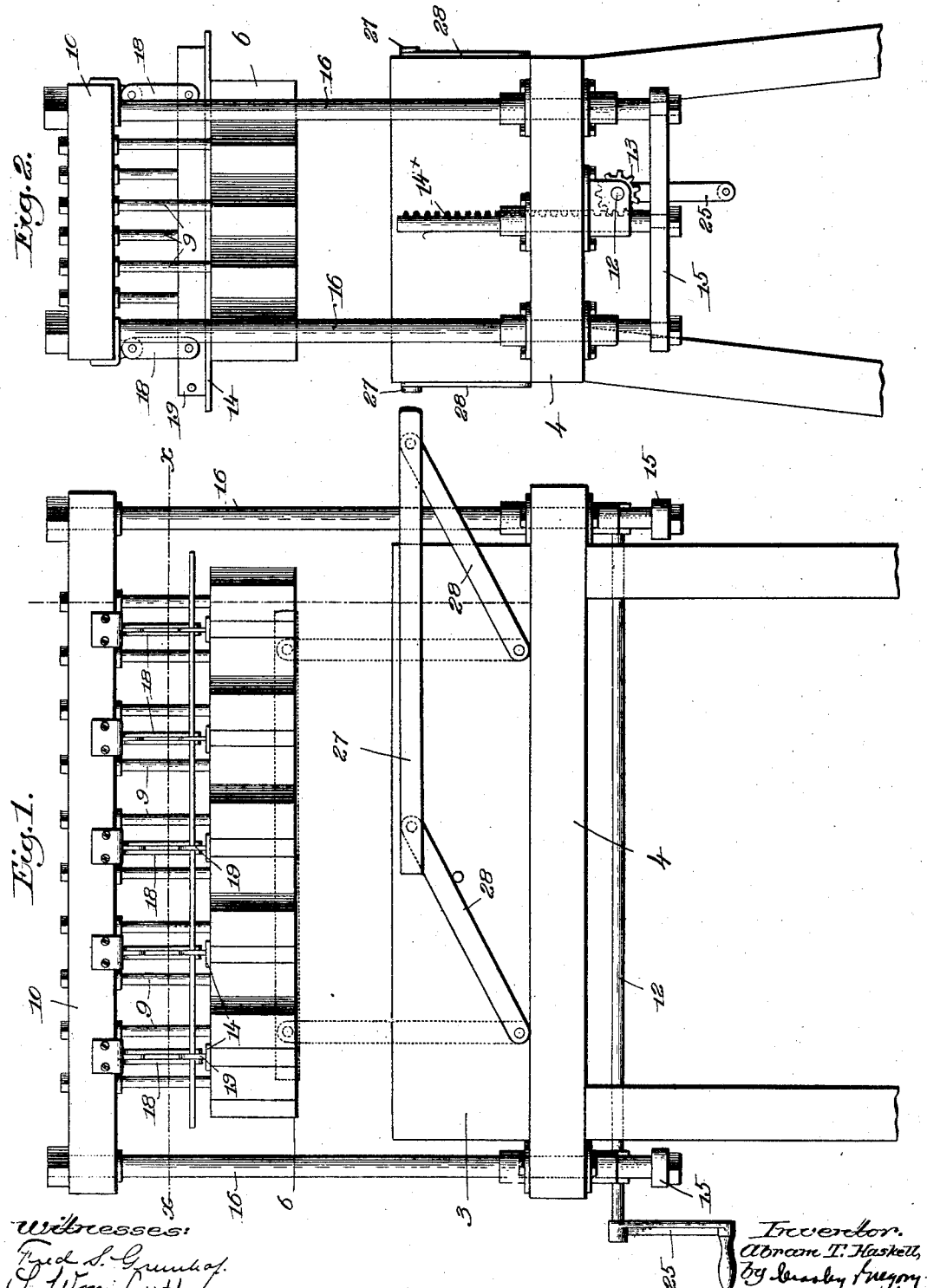

No. 737,620. PATENTED SEPT. 1, 1903.
A. T. HASKELL.
MACHINE FOR MOLDING AND PRESSING INTO SHAPE
MOLDABLE MATERIAL.
APPLICATION FILED JAN. 14, 1903.
NO MODEL. 2 SHEETS—SHEET 2.

Witnesses:
Inventor,
Abram T. Haskell,
by Crosby & Gregory
attys.

THE NORRIS PETERS CO., PHOTO-LITHO., WASHINGTON, D. C.

No. 737,620. Patented September 1, 1903.

UNITED STATES PATENT OFFICE.

ABRAM T. HASKELL, OF ASSONET, MASSACHUSETTS.

MACHINE FOR MOLDING AND PRESSING INTO SHAPE MOLDABLE MATERIAL.

SPECIFICATION forming part of Letters Patent No. 737,620, dated September 1, 1903.

Application filed January 14, 1903. Serial No. 138,980. (No model.)

*To all whom it may concern:*

Be it known that I, ABRAM T. HASKELL, a citizen of the United States, and a resident of Assonet, county of Bristol, State of Massachusetts, have invented an Improvement in Machines for Molding and Pressing into Shape Moldable Material, of which the following description, in connection with the accompanying drawings, is a specification, like numerals on the drawings representing like parts.

This invention relates to a machine for molding into blocks and pressing moldable material.

The machine illustrated comprises a hopper having in its bottom one or more half-mold cavities, a cellular cutter movable toward and from the hopper, and a plunger in each cell of the cutter, said plungers each having a half-mold cavity corresponding to one of the mold-cavities in the hopper. The movement of the cutter into the hopper operates to divide the material into portions of predetermined size, each portion being that quantity which is inclosed in one of the cells of the cutter. The shaping of the divided portion or portions of material is accomplished by the movement of the plunger or plungers in the cell or cells toward the hopper-bottom, such movement operating to compress each divided portion of material into the mold-cavity, half of which is situated in the hopper and the other half in the face of the plunger.

I will preferably employ a structure in which the cutter comprises a plurality of cells on the hopper-bottom and a corresponding number of half-mold cavities, so that a plurality of blocks or pieces of molded material may be formed simultaneously.

One of the features of this invention relates to means whereby each time that the cutter moves into the hopper and the plungers operate to mold the material into blocks all of the material which has been placed in the hopper will be thus molded, so that when the cutter and plungers are withdrawn from the hopper there will be no scraps or waste left to interfere with the next operation. This is accomplished by making the cells of the cutter of such cross-sectional shape that the side cells of adjacent walls fit each other, whereby there are no open spaces left between the cells, and by so forming the side cells of the hopper that they will conform exactly to the contour of the side walls of the cellular cutter. With this construction it will be apparent that whenever the cutter moves into the hopper all the material in the hopper will enter the various cells and when the plungers descend all of the material will be molded into the desired shape.

Other features of my invention will be hereinafter described and then more particularly pointed out in the claims.

Figure 4:
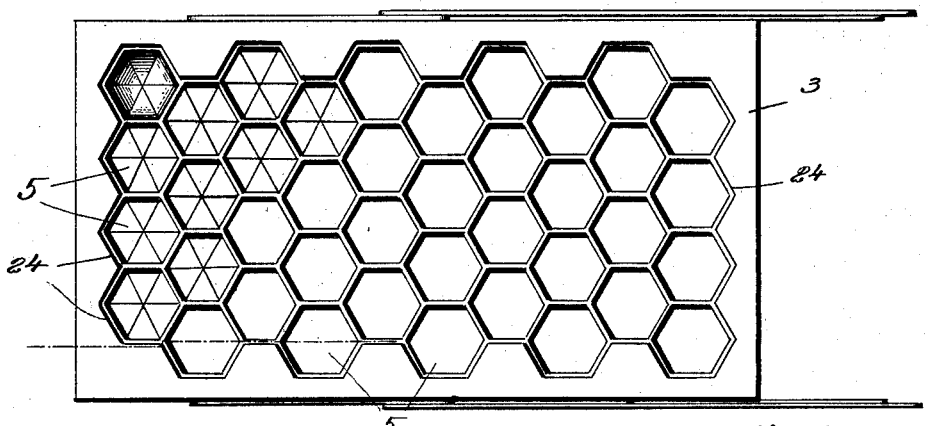
Figure 5:
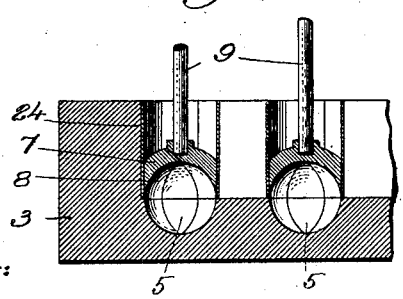
Figure 6:
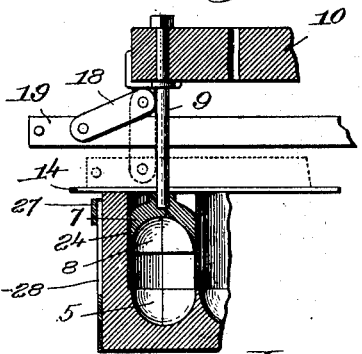

Referring to the drawings, Figure 1 is a front elevation of my improved machine. Fig. 2 is an end elevation thereof. Fig. 3 is a section on the line $x\ x$, Fig. 1. Fig. 4 is a top view of the hopper. Fig. 5 is a vertical section through two of the cells of the cutter, and Fig. 6 is a detail.

3 designates the hopper member, which is mounted upon a suitable framework 4 and which has in its bottom one or more half-mold cavities 5.

The cutter is designated by 6, and it has a cellular structure, there being one cell 28 for each of the half-mold cavities 5. Operating in each cell of the cutter is a plunger 7, having in its lower face a half-mold cavity 8, corresponding to one of the mold-cavities 5 in the hopper. Each of the plungers is connected by a stem 9 with a head 10, which may be moved toward and from the hopper by any suitable mechanism, that herein illustrated being a shaft 12, having pinions 13 thereon, which mesh with racks 14, connected to a cross-head 15, connecting two uprights 16, which in turn are connected to the head. The upright 16 and the racks 14 are shown as passing through and being guided by the frame 4. This particular mechanism for operating the head 10, however, is not essential to my invention, and any other suitable means may be employed. The lower edges of the side walls of the cells of the cutter will preferably be sharpened, so that when the cutter enters the material in the hopper 3 it will readily cut through the same. The cells 28 of the cutter are open at the top, as well as the bottom, and across the top of the cutter and rigidly secured thereto are a plurality of bars 14. A collapsible strut-piece is provided between each bar 14 and the head 10, so that the head 10 may operate to force the cutters downwardly or not, according to the position of said strut-piece. As herein shown, each strut-piece comprises links 18, hinged to the head 10 and to a bar or member 19, which is adapted to rest on the bar 14. When the links are placed vertically, as in Figs. 1 and 2, it will be obvious that the downward movement of the head 10 will be communicated to the cutter 6. The purpose of this collapsible-strut construction will be explained more fully hereinafter.

In order that all of the material which is placed in the hopper 3 may be operated upon and molded into shape each time that the device is operated, I make the various cells 28 of the cutter of such shape that the abutting side walls of the adjacent cells fit together without leaving any space between them. In the form of the invention herein illustrated the cells are hexagonal in cross-section and will be arranged as shown in Fig. 3. With this arrangement of cells each side wall 21 of each cell forms the side wall of an adjacent cell, and there are no interstices or spaces existing between adjacent walls. It will be obvious, of course, that the same result could be accomplished if the cells were rectangular in cross-section or triangular. With a cutter of this form the exterior wall 23 of the cutter will have a more or less irregular contour, and to prevent any material from accumulating between said wall 23 and the side walls 24 of the hopper I will construct the said side walls 24 with their inner faces shaped to conform to the shape of the cutter, as best seen in Fig. 4. With this construction it will be observed that whenever the cutter is lowered into the hopper all the material which has been previously placed in the hopper will be directed into the various cells and there will be no material left in the hopper which is not confined in one of the cells.

The operation of the device is as follows: The operator first places the material to be molded and pressed in the hopper 3, filling the hopper to a greater or less depth, according to the character of the material operated on. The collapsible struts 18 and 19 are placed in the position shown in Figs. 1 and 2 and the shaft 12 turned by any suitable means, such as a crank 25, thereby to lower the head 10 and force the cutter through the material in the hopper. When the links 18 are straightened, the plungers are at the upper end of the cells, as shown in dotted lines, Fig. 1, and the operation of lowering the cutter into the hopper results in dividing the material therein into portions, one of which is confined in each of the cells 28. It will be understood, of course, that the head is lowered until the lower edge of the cutter strikes the bottom of the hopper. The half-mold cavities 5 in the hopper are so positioned that one will be directly under each of the cells 28. The collapsible struts 18 and 19 are now collapsed by swinging all the bars 19 to the left, as shown in Fig. 6, and thereafter the head 10 is still further lowered, so as to force the plungers downwardly in the cells and compress and shape the divided portions of material into the molds formed by the mold-cavities 5 and 8, as seen in Fig. 5. The head 10 is then raised so as to lift the plungers and cutter, and during this operation the molded portions of material adhere to the plungers and are carried up therewith. In order to expel the molded portions of material from the cells, the plungers are now given a further downward movement in the cells. For this purpose a stop member 27, which is hinged to the hopper 3 by links 28, is swung into the dotted-line position, Fig. 1, and the head again lowered. During this operation the projecting ends of the bars 14 strike stop member 27 and limit further downward movement of the cutter, and when this occurs the further downward movement of the head 10 causes the plungers to expel the molded portions from the cells, as will be obvious. Such molded portions may be caught on a suitable tray or apron, which will be inserted beneath the cells at the proper time.

I have especially designed this device for molding into shape pop-corn balls; but it will be obvious that the machine may be used for molding any material into shape. It will also be obvious that the details of the structure may be varied in many ways without departing from the spirit of the invention as expressed in the appended claims.

Having described fully my invention, what I claim as new, and desire to secure by Letters Patent, is—

1. In a machine for molding and pressing moldable material, a hopper having a half-mold cavity, a cell-like cutter movable toward and from the hopper, and a plunger in said cutter, said plunger having a half-mold cavity corresponding to that in the hopper.

2. In a machine of the class described, a hopper having a plurality of half-mold cavities, a cellular cutter movable into and out of the hopper, and a plunger in each cell of the cutter, said plungers each having a half-mold cavity which forms with a corresponding one in the hopper a complete mold-cavity.

3. In a machine of the class described, a hopper having a half-mold cavity, a cell-like cutter movable into and out of the hopper, and a plunger in said cutter, said plunger having a half-mold cavity corresponding to that in the hopper, and means to move the plunger relative to the cutter.

4. In a machine of the class described, a hopper having a plurality of half-mold cavities, a cellular cutter movable into and out of the hopper, a plunger in each cell of the cutter, said plungers each having a half-mold cavity which forms with the corresponding one in the hopper a complete mold-cavity and means to move each plunger relative to its cell.

5. In a machine of the class described, a hopper having a plurality of half-mold cavities, a cellular cutter, the cells of which have such cross-sectional shape and disposition that the side walls of each cell fit the side walls of the adjacent cells, means to move the cells into and out of the hopper, and a plunger in each cell.

6. In a machine of the class described, a hopper, and a cellular cutter movable into and out of the hopper, the side walls of the hopper being shaped to conform to the contour of the cutter, and the cells of the cutter being so arranged as to leave no space between adjacent cells.

7. In a machine of the class described, a hopper, a cellular cutter movable into and out of the hopper, the side walls of the hopper being shaped to conform to the exterior contour of the cutter, and the cells of the latter being so arranged that there is no space between adjacent cells and a plunger in each cell of the cutter.

8. In a machine of the class described, a hopper, a cellular cutter movable into and out of the hopper, the cells having such a cross-sectional shape and disposition with relation to each other that the side walls of each cell correspond to the side walls of adjacent cells, and a compressing-plunger movable in each cell.

9. In a machine of the class described, a hopper, a cellular cutter movable into and out of the hopper, the side walls of the hopper being shaped to conform to the exterior contour of the cutter and the cells being so shaped and disposed with relation to each other that the side walls of each cell conform to the side walls of the adjacent cells, and a compressing-plunger operating in each cell.

10. In a machine of the class described, a hopper, a cellular cutter, a compressing-plunger in each cell of the cutter, means to force the cutter into the hopper, and means thereafter to compress the material in each cell between the plunger and hopper-bottom.

11. In a machine of the class described, a hopper, a cellular cutter, a plunger in each cell of the cutter, means to cause the cutter to enter the hopper, means to compress the material in each cell between the plunger therein and the hopper-bottom, and means to expel the compressed material from the cells.

12. In a machine of the class described, a hopper having a plurality of half-mold cavities in its bottom, a cellular cutter having a corresponding number of cells, a plunger in each cell, means to cause the cutter to move into the hopper, and means to compress and shape the material in each cell between the plungers therein and the face of the corresponding half-mold cavity.

13. In a device of the class described, a hopper having a plurality of half-mold cavities in its bottom, a cellular cutter, a plunger in each cell of the cutter, said plungers each having a half-mold cavity in its face, means to cause the cutter to enter the hopper, and means to compress and shape the material in the cells in the mold-cavity formed by the plunger and hopper.

14. In a device of the class described, a hopper, a cellular cutter, a plunger in each cell of the cutter, a head to which all of said plungers are connected, means to move the head toward and from the hopper and a collapsible-strut connection between the cutter and head.

In testimony whereof I have signed my name to this specification in the presence of two subscribing witnesses.

ABRAM T. HASKELL.

Witnesses:
ALBERT H. THURSTON, Jr.,
EARL F. PEARCE.